US012767052B2

(12) United States Patent
Solar

(10) Patent No.: US 12,767,052 B2
(45) Date of Patent: Oct. 20, 2026

(54) VEHICULAR DRIVER MONITORING SYSTEM WITH VIDEO-CALLING FUNCTION

(71) Applicant: Magna Electronics Inc., Auburn Hills, MI (US)

(72) Inventor: Martin Solar, Erlenbach (DE)

(73) Assignee: Magna Electronics inc., Auburn Hills, MI (US)

( * ) Notice: Subject to any disclaimer, the term of this patent is extended or adjusted under 35 U.S.C. 154(b) by 0 days.

(21) Appl. No.: 19/211,387

(22) Filed: May 19, 2025

(65) Prior Publication Data

US 2025/0276646 A1 Sep. 4, 2025

Related U.S. Application Data

(63) Continuation of application No. 18/487,153, filed on Oct. 16, 2023, now Pat. No. 12,304,396, which is a continuation of application No. 17/647,760, filed on Jan. 12, 2022, now Pat. No. 11,787,342.

(60) Provisional application No. 63/199,617, filed on Jan. 13, 2021.

(51) Int. Cl.
*B60R 1/29* (2022.01)

(52) U.S. Cl.
CPC .......... *B60R 1/29* (2022.01); *B60R 2300/207* (2013.01); *B60R 2300/8006* (2013.01)

(58) Field of Classification Search
None
See application file for complete search history.

(56) References Cited

U.S. PATENT DOCUMENTS

| | | | | |
|---|---|---|---|---|
| 10,708,542 | B1 * | 7/2020 | Griffin | H04W 4/40 |
| 2011/0090338 | A1 * | 4/2011 | DeLine | G07F 7/1008 348/148 |
| 2018/0345988 | A1 * | 12/2018 | Mimura | B60W 30/16 |

* cited by examiner

*Primary Examiner* — Rebecca A Volentine
(74) *Attorney, Agent, or Firm* — HONIGMAN LLP

(57) ABSTRACT

A vehicular driver monitoring system includes an interior rearview mirror assembly at an interior cabin of a vehicle, with a camera at the interior rearview mirror assembly and viewing toward at least a front driver seat region of the vehicle. Image data captured by the camera is processed to monitor a driver of the vehicle. Video-calling wireless communication between an occupant of the vehicle and a party exterior of the vehicle includes wireless communication between the vehicle and an external receiver located remote from the vehicle that is based on audio speech data captured by a microphone of the vehicle, audio output by a speaker of the vehicle, image data captured by the camera and wirelessly communicated from the vehicle to the external receiver and display at a video display screen of video images based on image data wirelessly communicated from the external receiver to the vehicle.

26 Claims, 2 Drawing Sheets

VEHICULAR DRIVER MONITORING SYSTEM WITH VIDEO-CALLING FUNCTION

CROSS REFERENCE TO RELATED APPLICATIONS

The present application is a continuation of U.S. patent application Ser. No. 18/487,153, filed Oct. 16, 2023, now U.S. Pat. No. 12,304,396, which is a continuation of U.S. patent application Ser. No. 17/647,760, filed Jan. 12, 2022, now U.S. Pat. No. 11,787,342, which claims the filing benefits of U.S. provisional application Ser. No. 63/199,617, filed Jan. 13, 2021, which is hereby incorporated herein by reference in its entirety.

FIELD OF THE INVENTION

The present invention relates generally to a driver monitoring system for a vehicle and, more particularly, to a driver monitoring system that utilizes one or more cameras at a vehicle.

BACKGROUND OF THE INVENTION

Cabin monitoring systems are known that monitor an interior cabin of the vehicle to determine presence of an occupant in the vehicle or the vehicle driver's awareness level. Examples of such systems are described in U.S. Pat. Nos. 8,258,932; 6,485,081 and 6,166,625, which are hereby incorporated herein by reference in their entireties.

SUMMARY OF THE INVENTION

A driving assistance system or vision system or imaging system or driver monitoring system or cabin monitoring system for a vehicle utilizes one or more interior cabin viewing cameras (preferably one or more CMOS cameras) to capture image data representative of images interior of the vehicle, and provides an electronic control unit (ECU) comprising electronic circuitry and associated software. The system provides the captured image data to a video-calling or video-conferencing application and receives communication data from the video-calling application, and generates outputs (such as video display outputs and/or audio outputs) representative of the received communication data at the vehicle.

Optionally, for example, the system may provide a video display screen for producing video images of the received communication data and/or a speaker for producing audio outputs of the received communication data. The system may also provide a microphone for capturing audio data from the interior of the vehicle and/or may communicate the captured audio data to the video-calling application.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system and/or driver or cabin monitoring system operates to capture images interior of the vehicle and may process the captured image data to display images and to detect driver or occupant behavior. The vehicle driver monitoring system may also capture images interior of the vehicle and may process the captured image data to monitor the driver of the vehicle and to display images of the driver of the vehicle. The driver monitoring system includes an electronic control unit (ECU), which includes electronic circuitry and associated software, with the circuitry including an image processor that is operable to process image data received from one or more cameras and provide an output to a display device for displaying images representative of the captured image data.

Figure 1:
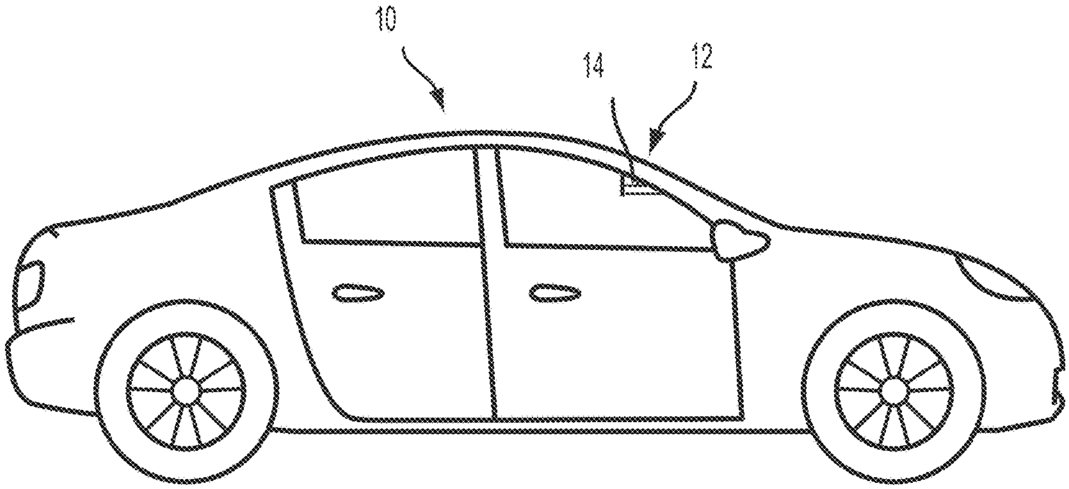
FIG. 1 is a plan view of a vehicle with a driver monitoring system that includes a camera at an interior cabin of the vehicle and viewing at least a head region of a driver of the vehicle.

Referring now to the drawings and the illustrative embodiments depicted therein, FIG. 1 depicts a vehicle 10 that includes an imaging system or vision system or driver monitoring system 12 that includes one or more interior cameras 14, such as a driver or cabin monitoring camera. The interior camera 14 is disposed within the vehicle 10 such that it captures image data representative of the interior of the vehicle. For example, the interior camera may capture image data representative of at least a portion of the driver, such as the head region of the driver of the vehicle. The imaging system may have one or more interior cameras configured to track eye movements or otherwise capture image data of the driver such as to determine the attentiveness of the driver. Image data captured by the interior camera or cameras is processed at the ECU to provide the desired cabin or driver monitoring system. Thus, the camera and ECU may provide a cabin or driver monitoring function. The system 12 may also provide a video output to a video conference calling function or application, such as part of a telematics system of the vehicle, as discussed below.

Vehicles increasingly have additional features to be used in assisting or enabling the driving of a vehicle (such as Advanced Driver Assistance Systems (ADAS) including lane-keep, lane-change assist, parking assist, collision avoidance or automatic braking systems or other autonomous driving programs or driver alert systems such as blind spot monitoring or backup cameras and alert systems). Conditional (SAE L3) and higher driving automation levels allow the driver to take over additional non-driving tasks during normal traffic conditions (or when riding in an autonomous vehicle) such as hands free phone calling using the connectivity of the vehicle or by using the connectivity of a cellphone within the vehicle or voice-controlled commands for navigation, radio control, etc. Thus, many vehicles are online through wide area network (WAN) connections or may have connectivity through a separate connected device such as a cellphone. Thus, many vehicles also have microphones, voice recognition software, sophisticated processing, etc. to enable these various features.

With an increasing number of vehicles equipped with ADAS that are capable of partially controlling the longitudinal and lateral movement of a vehicle, some drivers tend to show overreliance on these assistance systems. Numerous instances of drivers misusing the systems (e.g., acting as if the vehicle is fully "self-driving" and taking their hands off the steering wheel or even leaving the driver seat) have been recorded. Unfortunately, this irresponsible behavior has already led to fatal crashes. Cabin or driver monitoring systems are becoming increasingly common in vehicles to counteract the dangers of distracted drivers in vehicles, such as vehicles equipped with ADAS. These cabin monitoring systems may monitor driver behavior and awareness and/or may provide surveillance of passengers in the second and/or third row of seats in the vehicle and/or may provide detection of objects left in the vehicle by a passenger that has left the vehicle. Such cabin monitoring systems include a camera or plurality of cameras which provide image data to an electronic control unit (ECU) for processing to determine driver attentiveness or drowsiness or the like (and/or to either display the images or run algorithms on the image data). The cabin monitoring system may monitor driver behavior and awareness, provide surveillance of passengers within the cabin of the vehicle, and/or detect objects/people still in the vehicle after the driver has left the vehicle and may be connected to ADAS or autonomous vehicle systems. Such driver monitoring systems are becoming standard equipment for new vehicles. For example, the European Union (through Euro NCAP) is requiring that all new cars homologated in Europe have a driver monitoring system by 2022 and all new cars sold by 2024.

For autonomous vehicles suitable for deployment with the system 12, an occupant of the vehicle may, under particular circumstances, be desired or required to take over operation/control of the vehicle and drive the vehicle so as to avoid potential hazard for as long as the autonomous system relinquishes such control or driving. In such circumstances, the occupant of the vehicle becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system 12 utilizes the driver monitoring system for the additional purpose of enabling video communication outside of the vehicle. Video communication such as video conferencing or video calling is a common form of communication between business partners, parents and children, friends, family, etc. Such video communication may be configured to operate using a driver monitoring system. The system may send video images (of the driver as captured by or derived from the driver monitoring system) to either an in-vehicle application or by streaming video images to a third party device (cellphone, tablet, wearable device or the like) or similar device being used for video calls. The system may also receive incoming audio and/or an incoming video stream for display at a video display screen disposed at the vehicle instrument cluster or central display location (e.g., a video display screen at an interior rearview mirror assembly or at the center console or video display of video images via a heads up display or the like), thus allowing the driver to run real two-way video conferencing out from the vehicle. Furthermore, the system is capable of receiving both incoming audio and incoming video stream and may distinguish when to output only the audio stream and when to additionally display the incoming video stream at the video display screen (such as at SAE L3 levels and higher).

To enable video calling from a vehicle, the driver monitoring system is disposed at the vehicle including a video sensor or imaging device (e.g., one or more cameras) disposed at the vehicle and having a field of view interior of the vehicle for detecting and supervising driver behavior (e.g., manual distractions) and an ECU having an image processor for processing image data captured by the camera. A microphone, speaker, and display may also be disposed at the vehicle. The camera and/or ECU are in communication with a video-conferencing or video-calling application. The video-calling application may be provided via software at the ECU or on a third party device. The video-calling application is in communication with a WAN for communicating and receiving communication data. The communication data communicated from the video-calling application comprises at least image data captured by the driver monitoring camera at the vehicle and may also comprise audio data captured by a microphone at the vehicle. The communication data received at the video-calling application is to be communicated to the driver and/or occupant of the vehicle. The received communication data may comprise video images to be displayed at a display at the vehicle and/or audio outputs to be output through a speaker at the vehicle. Thus, a driver or cabin monitoring system with a video-calling application may enable video conferencing or video calling between a driver and/or occupant of a vehicle and a party exterior to the vehicle.

Figure 2:
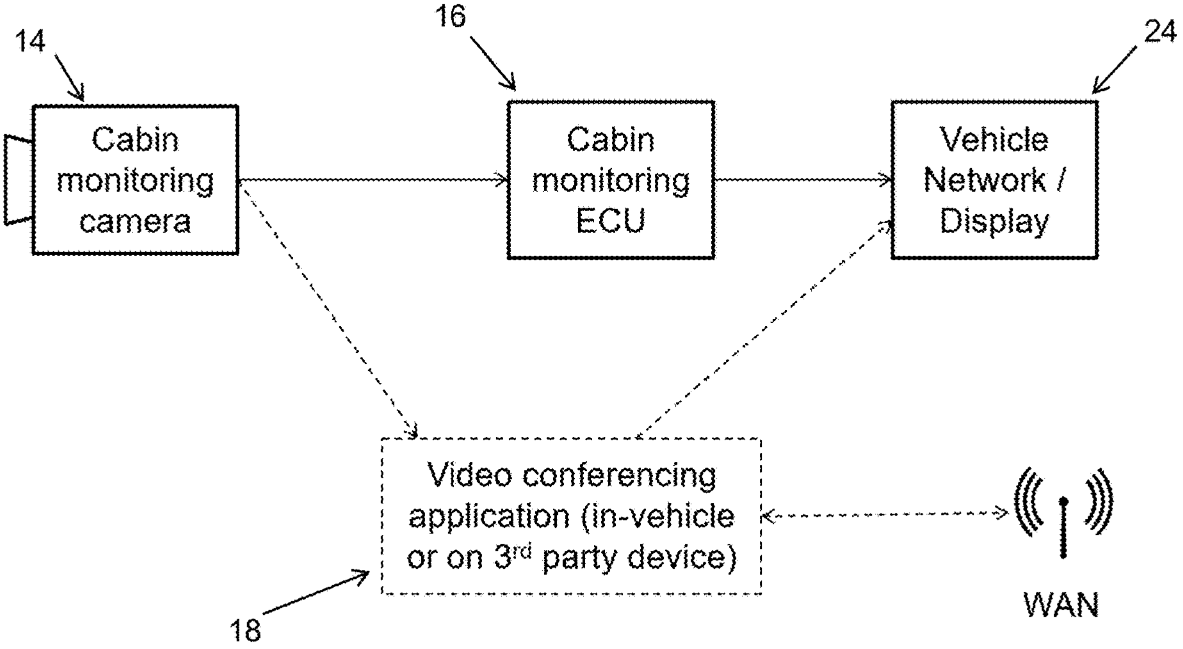
FIG. 2 is a block diagram of an example driver monitoring system in communication with a video conferencing application.
Figure 3:
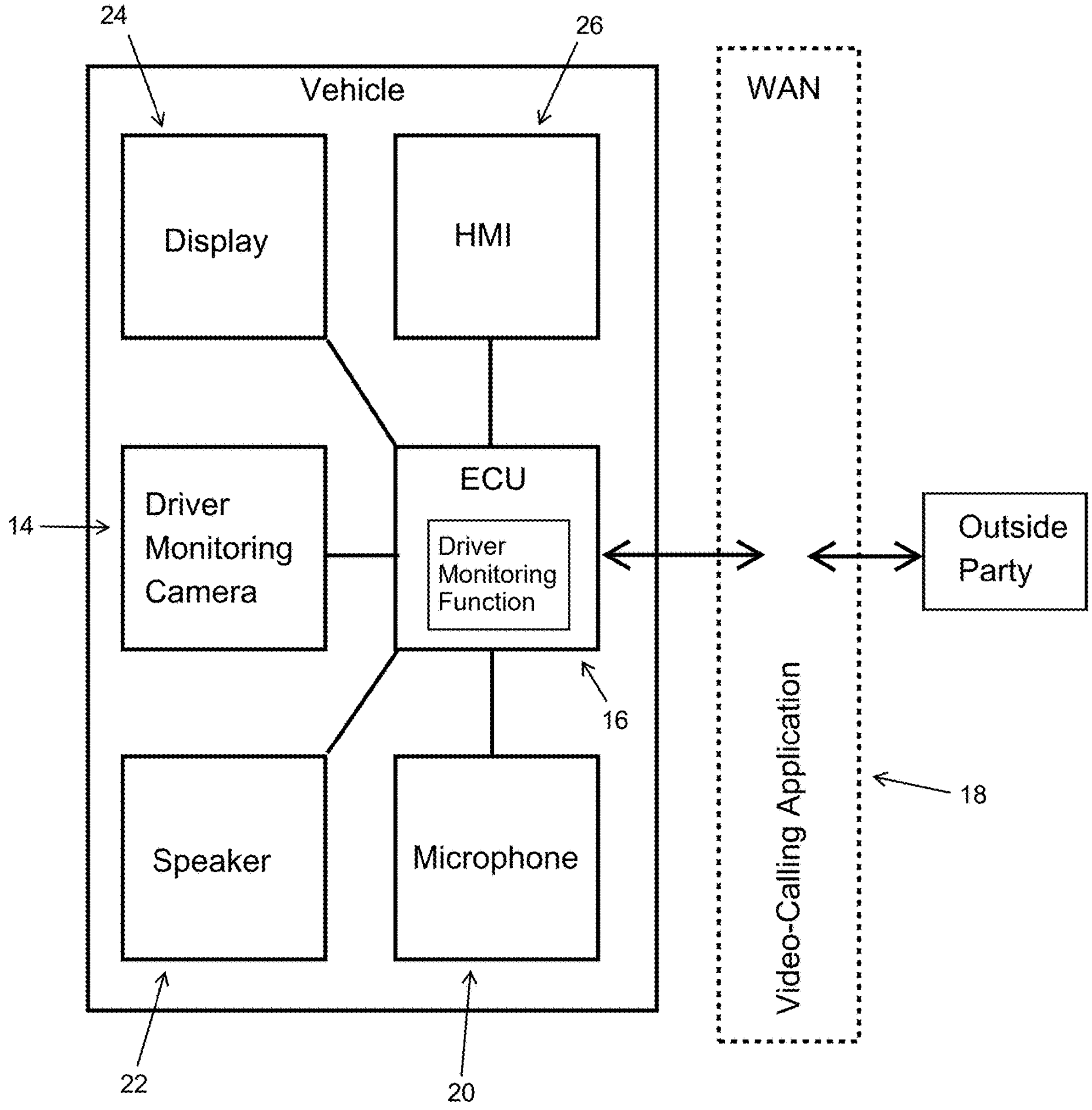
FIG. 3 is a block diagram of an example driver monitoring system in communication with a video conferencing application.

Referring now to FIGS. 2 and 3, the camera 14 and/or ECU 16 are alternatively or additionally and/or simultaneously used for the purpose of video calling through a connection to the video-calling or video-conferencing application 18. The cabin or driver monitoring camera may provide the captured image data directly to the video-conferencing or video-calling application and/or provide the image data to the ECU at the vehicle, which may provide the image data to the video-calling application. In examples where the camera provides the captured image data directly to the video-calling application (as shown in FIG. 2), the camera is enabled to communicate wirelessly with the video-calling application. The camera may also or alternatively provide the captured image data to the ECU for processing of the image data for the cabin monitoring system and/or processing of the image data for the video-calling application (such as shown in FIG. 3). The ECU may contain software providing the video-calling application or may be wirelessly connected to the video-calling application via a vehicle network or WAN. Thus, the ECU may receive image data from the camera and process the image data to communicate processed image data to the video-calling application and/or other functions enabled by a vehicle network such as a cabin or driver monitoring system.

The system 12 may also include a microphone 20 that captures audio data. Audio data is captured at the microphone and communicated (with the accompanying image data captured simultaneously at the camera) either directly to the video-calling application or the ECU at the vehicle. The ECU 16 may include a data processor or digital signal processor (DSP) that processes the captured audio data with the captured image data for communicating the captured image data and audio data to the video-calling application. The microphone may be a part of a vehicle system already incorporated at the vehicle such as for hands free calling or voice controls. The microphone may also be a part of a separate device within the vehicle such as a cellphone or BLUETOOTH® earpiece wirelessly connected to the systems of the vehicle.

The video-conferencing or video-calling application receives captured image data and/or captured audio data and enables the video communication between the driver and/or occupant of the vehicle and a party exterior of the vehicle. The video-calling application transmits the captured image and/or audio data to the outside party exterior of the vehicle via connection to a WAN. The video-calling application may either comprise software at the ECU of the vehicle or software on the computer of a connected device such as a cellphone or personal computer. The video-calling application also receives communication data from the third-party via a WAN to further enable two-way communication between the driver and/or occupant of the vehicle and the party exterior of the vehicle. The communication data received at the video-calling application may include audio data and/or video data. The audio data may be output through a speaker at the vehicle and the video data may be displayed at a display at the vehicle The system 12 may include a speaker 22 that provides audio outputs (responsive to received signals that are representative of audio inputs from the remote user(s) at the other end of the video conference). The speaker may be a part of a vehicle system such as the vehicle's sound system or a dedicated speaker for hands free calling. The speaker may also be a part of a separate device within the vehicle such as a cellphone or BLUETOOTH® earpiece wirelessly connected to the systems of the vehicle.

The system may include a display 24 (such as a video display screen disposed in the vehicle so as to be viewable by the driver of the vehicle) that also provides video outputs (responsive to received signals that are representative of video inputs from the remote user(s) at the other end of the video conference). The video outputs may be from the communication data received at the system from the video-calling application. Additionally and/or alternatively, the video outputs may be representative of the video images captured by the camera at the vehicle so that the driver may view the images being transmitted as part of the video conference or call. In situations where the display provides video outputs of both the communication data and the captured video images, the display may show the videos simultaneously in a split-screen or picture-in-picture format or any suitable format so that the two sets of video images are discernible from one another. The display may be a central display or contained in the instrument cluster of the vehicle or at an interior rearview mirror assembly of the vehicle.

The system may further include a human-machine interface (HMI) 26 for receiving inputs from a driver to initiate or otherwise control the video-call or video-conference function provided to the equipped vehicle by the present system. The HMI may comprise a user or driver actuatable button or switch disposed in the vehicle in reach of the driver such as on the dashboard or on steering wheel controls, a selectable option of an infotainment system of the vehicle selectable for example through a touch-screen display, a voice command, or any other suitable means for a driver and/or occupant of the vehicle to activate and operate the system. Responsive to an input at the HMI, the system may activate the video-call function by transmitting a signal to the ECU. Responsive to the signal received at the ECU from the HMI, the ECU (which may already be processing image data for purposes of a driver monitoring function) may begin processing image data for the purpose of a video-call function in accordance with the present disclosure.

The system may limit when video outputs are displayed at the display in the vehicle, such as via a preset threshold speed or upon a determination by an ADAS or autonomous control system of the vehicle. In any scenario, the system may continue capturing image data at the camera and/or audio data at the microphone and providing audio outputs at the speaker so as to maintain the call between the driver and/or occupant of the vehicle and the third party even if the driver is not able to view video outputs at that time. For example, when the vehicle is travelling above the threshold speed (as determined at the ECU or via a signal received at the ECU), the system may stop providing video outputs at the display. The threshold speed may be 0 miles per hour so to only enable video outputs when the vehicle is stopped or parked (or optionally, the video display function may be deactivated when the vehicle is shifted out of park and/or into a drive or reverse gear). The threshold speed may also be set at a speed (such as 35 miles per hour or 55 miles per hour) to only enable video outputs when, for example, the vehicle is travelling below highway speeds. If the vehicle is travelling above the threshold speed, but slows down so as to travel below the threshold speed, the system may resume providing video outputs at the display.

Furthermore, when a video-call function is used in vehicles utilizing autonomous control systems (where the autonomous control system is controlling steering and speed and braking/acceleration of the vehicle as the vehicle travels along a road), the driver monitoring system and autonomous system may work together to determine when or if the driver needs to and is ready to take over control of the vehicle (e.g., responsive to an emergency situation or detection of a construction zone ahead of the vehicle or the like). For example, responsive to determination of a driving condition where the driver should take over control of the vehicle from the autonomous control system, the system may cease the video display and alert the driver to take over control of the vehicle, without completely terminating the call. Optionally, the system may only display video images at the video display as part of the video-call function when one or more ADAS are engaged. For example, the system may only display video images when an autonomous or semi-autonomous driving program of the vehicle is at least partially controlling the vehicle as the vehicle travels along a road.

As shown in FIG. 3, the system includes the display 24, the human machine interface (HMI) 26, the driver monitoring camera 14, at least one speaker 22, and at least one microphone 20, which are provided at the vehicle and communicably connected to the ECU 16 at the vehicle. The driver monitoring camera 14 cooperates with the ECU 16 to provide the driver monitoring function. The camera 14 captures image data and transmits the captured image data to the ECU 16 for processing. The ECU 16 processes the captured image data received from the driver monitoring camera 14 for the purpose of providing the driver monitoring function. Upon activation of the video-call function through a user input at the HMI 26 by the driver or occupant of the vehicle, the HMI 26 may communicate a signal to the ECU 16 and the ECU 16 may activate the video-call function of the present disclosure. The driver monitoring camera 14 communicates image data to the ECU 16. The ECU 16 processes the image data for the purpose of the video-call function (and may also process the image data for the driver monitoring function).

In the illustrated embodiment, the ECU 16 also receives audio data from the microphone 20 representative of sounds from the interior cabin of the vehicle and processes the audio data and the image data for the video-call function. In this embodiment, the video-calling application 18 is hosted by a wirelessly connected device outside the vehicle and in communication with both the vehicle and the outside party who the driver is communicating with via a WAN. The ECU 16 communicates the processed video data and audio data to the video-calling application 18 and receives communication data from the video-calling application 18. The communication data contains video images and audio from the outside party. The ECU 16 processes the communication data and provides audio outputs at the speaker 22 and displays the received video images at the display 24. If the ECU 16 determines, or receives a signal indicating that the vehicle is travelling above a preset threshold speed or should otherwise cease the video display, the ECU 16 may stop displaying video images at the display 24, but continue providing audio outputs through the speaker 22, capturing sounds with the microphone 20 and video images with the driver monitoring camera 14. Thus, even if the vehicle is travelling above the threshold speed, the driver may still hear the outside party even if video images may not be displayed at the display. Accordingly, the outside party will still see and hear the driver as the camera continues to capture video images and the microphone continues to capture sound even if the vehicle is travelling above the threshold speed.

Thus, the driver monitoring system has the additional function of providing video image data for video phone calls. The system thus adds value by repurposing driver monitoring cameras, for example, for video-conferencing or video-calling functionality, so that a manufacturer may differentiate vehicle features. The system enables cabin monitoring systems in safety applications, augmented reality displays, interior sensing with deep neural networks, and artificial intelligence, and avoids having to use two or more cameras to provide multi-functionality, which adds cost to the vehicle.

The driver monitoring camera may be disposed at an interior rearview mirror assembly of the vehicle, such as at or in a movable mirror head of the mirror assembly. The camera may be disposed behind the mirror reflective element of the mirror head, with the mirror reflective element comprising a partially light transmissive and partially light reflective transflective mirror reflector, such that the camera views through the transflective mirror reflector of the mirror reflective element toward a head region of the driver of the vehicle. The mirror assembly may include a printed circuit board (PCB) having the control or control unit comprising electronic circuitry (disposed at the circuit board or substrate in the mirror casing), which includes driver circuitry for controlling dimming of the mirror reflective element (for applications where the mirror reflective element comprises an electro-optic, such as electrochromic, mirror reflective element). The mirror assembly may also include a DMS circuit board, which includes a processor that processes image data captured by the DMS camera for monitoring the driver and determining, for example, driver attentiveness and/or driver drowsiness. The driver monitoring system includes the driver monitoring camera and may also include an occupant monitoring camera (or the driver monitoring camera may view the occupant or passenger seat of the vehicle as well as the driver region), and may provide occupant detection and/or monitoring functions as part of an occupant monitoring system (OMS).

The ECU, along with the camera and optionally a light source (such as one or more IR or near-IR light emitting diodes (LEDs) or vertical-cavity surface-emitting lasers (VCSEL) or the like), may be disposed within the movable mirror head or the ECU may be disposed remote from the mirror head. The transflective mirror reflector of the mirror reflective element (such as an electro-optic (such as electrochromic (EC)) mirror reflective element or prismatic mirror reflective element) transmits near infrared light and reflects visible light. Thus, the mirror reflective element (i.e., a transflective mirror reflector of the mirror reflective element) effectively allows IR emitters to emit light through the reflective element and allows the camera to 'view' through the mirror reflective element, while allowing the mirror reflective element to reflect at least some visible light incident thereat to serve its intended rear viewing purpose. The IR emitters may be activated responsive at least in part to an ambient light level within the vehicle cabin and at the driver's head region, with the light level being determined by a light sensor or by processing of image data captured by the driver monitoring camera.

The system may process image data captured by the camera (and optionally may process outputs of one or more other sensors) to determine various driver features. For example, the system may determine any one or more (and any combination) of the following features: (i) driver's (or occupant's) head found, (ii) abnormal head posture, (iii) detection of a fake head at the driver seat/region or at the passenger seat/region, (iv) driver's (or occupant's) eyes closed, (v) driver's eyes off the road ahead of the vehicle, (vi) driver's position in the driver seat (and/or occupant's position in the passenger seat), (vii) driver viewing a target, (viii) driver (or occupant) sleeping, (ix) driver (or occupant) drowsiness level, (x) driver hand position category (such as by utilizing aspects of the systems described in U.S. Publication No. US-2018-0231976, which is hereby incorporated herein by reference in its entirety), (xi) driver held object classification, (xii) driver's (or occupant's) head nodding, (xiii) driver (or occupant) yawning, (xiv) driver's (or occupant's) body turning, (xv) driver (or occupant) holding phone at head, (xvi) change in driver (or occupant), (xvii) face identification, (xviii) presence of an occupant, and/or (xix) presence of a child.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/450,721, filed Oct. 13, 2021, now U.S. Pat. No. 11,518,401, and/or U.S. provisional applications, Ser. No. 63/260,359, filed Aug. 18, 2021, Ser. No. 63/201,894, filed May 18, 2021, Ser. No. 63/201,757, filed May 12, 2021, Ser. No. 63/201,371, filed Apr. 27, 2021, Ser. No. 63/200,451, filed Mar. 8, 2021, Ser. No. 63/200,315, filed Mar. 1, 2021, Ser. No. 63/200,003, filed Feb. 9, 2021, and/or Ser. No. 63/199,918, filed Feb. 3, 2021, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a video device for internal cabin surveillance, such as disclosed in U.S. Pat. Nos. 5,760,962; 5,877,897; 6,690,268; 7,370,983; 7,937,667 and/or 9,800,983, and/or U.S. Publication No. US-2006-0050018, which are hereby incorporated herein by reference in their entireties.

Optionally, the system may include a display for displaying images captured by the camera and/or provided by the communication system for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties. The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:

an interior rearview mirror assembly disposed at an interior portion of an interior cabin of a vehicle;

wherein the interior rearview mirror assembly comprises a mirror head that accommodates a mirror reflective element;

a camera disposed at the interior rearview mirror assembly of the vehicle;

wherein the camera views at least a front driver seat region of the vehicle;

an electronic control unit (ECU) comprising electronic circuitry and associated software, wherein the electronic circuitry comprises an image processor for processing image data captured by the camera;

wherein the ECU is disposed in the vehicle at a location remote from where the interior rearview mirror assembly is located within the interior cabin of a vehicle;

wherein image data captured by the camera is provided from the interior rearview mirror assembly to the ECU;

wherein provided captured image data is processed at the ECU to monitor a driver of the vehicle;

wherein provided captured image data is processed at the ECU for video-calling;

a microphone disposed within the interior cabin of the vehicle, wherein the microphone is operable to capture audio speech data from within the interior cabin of the vehicle;

a speaker disposed within the interior cabin of the vehicle, wherein the speaker is operable to output audio within the interior cabin of the vehicle;

a video display screen disposed within the interior cabin of the vehicle, wherein the video display screen is operable to display video images for viewing by an occupant of the vehicle;

wherein, based at least in part on (i) processing at the ECU of provided captured image data and (ii) audio speech data captured by the microphone, video-calling wireless communication between the occupant of the vehicle and a party exterior of the vehicle is enabled;

wherein video-calling wireless communication between the occupant of the vehicle and the party exterior of the vehicle comprises wireless communication from the vehicle to an external receiver located remote from the vehicle that is based at least in part on (i) audio speech data captured by the microphone and (ii) processing at the ECU of provided captured image data;

wherein video-calling wireless communication between the occupant of the vehicle and the party exterior of the vehicle comprises wireless communication from the external receiver to the vehicle of data;

wherein video-calling wireless communication between the occupant of the vehicle and the party exterior of the vehicle comprises (i) audio speech data captured by the microphone and wirelessly communicated from the vehicle to the external receiver, (ii) audio output by the speaker that is derived from audio data that is wirelessly communicated from the external receiver to the vehicle, (iii) image data captured by the camera and wirelessly communicated from the vehicle to the external receiver and (iv) display at the video display screen of video images that are at least in part based on image data that is wirelessly communicated from the external receiver to the vehicle; and wherein, with speed of the vehicle exceeding a threshold speed, (a) video-calling wireless communication between the occupant of the vehicle and the party exterior of the vehicle is provided via (i) audio speech data captured by the microphone and wirelessly communicated from the vehicle to the external receiver and (ii) audio output by the speaker that is derived from audio data that is wirelessly communicated from the external receiver to the vehicle, and (b) the video display screen does not display video images that are at least in part based on image data that is wirelessly communicated from the external receiver to the vehicle.

2. The vehicular driver monitoring system of claim 1, wherein, with speed of the vehicle exceeding the threshold speed, video-calling wireless communication between the occupant of the vehicle and the party exterior of the vehicle is in part provided via image data captured by the camera and wirelessly communicated from the vehicle to the external receiver.

3. The vehicular driver monitoring system of claim 1, wherein the vehicle comprises a control system that is operable to at least partially control the vehicle as the vehicle travels along a road, and wherein, with speed of the vehicle exceeding the threshold speed, and with the control system operating to at least partially control the vehicle as the vehicle travels along the road, the video display screen displays video images that are at least in part based on image data that is wirelessly communicated from the external receiver to the vehicle.

4. The vehicular driver monitoring system of claim 1, wherein, during a reversing maneuver of the vehicle, the video display screen is operable to simultaneously display (i) video images that are at least in part based on image data that is wirelessly communicated from the external receiver to the vehicle and (ii) video images derived from image data captured by a rear backup camera of the vehicle, and wherein the displayed video images that are at least in part based on image data that is wirelessly communicated from the external receiver to the vehicle and the displayed video images derived from image data captured by the rear backup camera of the vehicle are discrete and discernible, one from the other.

5. The vehicular driver monitoring system of claim 4, wherein the displayed video images derived from image data captured by the rear backup camera of the vehicle are derived from processing at the ECU of image data captured by the rear backup camera.

6. The vehicular driver monitoring system of claim 1, wherein the mirror reflective element of the interior rearview mirror assembly comprises a transflective mirror reflector, and wherein the camera is disposed within the mirror head and views through the transflective mirror reflector of the mirror reflective element toward at least the front driver seat region of the vehicle.

7. The vehicular driver monitoring system of claim 6, wherein a light emitter is disposed within the mirror head of the interior rearview mirror assembly and is operable to emit near infrared light that passes through the transflective mirror reflector of the mirror reflective element to illuminate at least a portion of the driver of the vehicle that is viewed by the camera.

8. The vehicular driver monitoring system of claim 1, wherein a light emitter is disposed at the mirror head of the interior rearview mirror assembly and is operable to emit near infrared light to illuminate at least a portion of the driver of the vehicle that is viewed by the camera.

9. The vehicular driver monitoring system of claim 8, wherein the light emitter comprises at least one near infrared light emitting diode.

10. The vehicular driver monitoring system of claim 8, wherein the light emitter comprises at least one vertical-cavity surface-emitting laser.

11. The vehicular driver monitoring system of claim 1, wherein the video display screen displays video images derived from captured image data processed at the ECU.

12. The vehicular driver monitoring system of claim 1, wherein the occupant is the driver of the vehicle.

13. The vehicular driver monitoring system of claim 1, wherein the occupant is a passenger of the vehicle.

14. The vehicular driver monitoring system of claim 1, wherein provided captured image data is processed at the ECU to determine at least one selected from the group consisting of (i) the driver's eyes being closed, (ii) the driver's eyes being off a road ahead of the vehicle, (iii) the driver being drowsy and (iv) the driver yawning.

15. A vehicular driver monitoring system, the vehicular driver monitoring system comprising:

an interior rearview mirror assembly disposed at an interior portion of an interior cabin of a vehicle;

wherein the interior rearview mirror assembly comprises a mirror head that accommodates a mirror reflective element;

a camera disposed at the interior rearview mirror assembly of the vehicle;

wherein the camera views at least a front driver seat region of the vehicle;

an electronic control unit (ECU) comprising electronic circuitry and associated software, wherein the electronic circuitry comprises an image processor for processing image data captured by the camera;

wherein the ECU is disposed in the vehicle at a location remote from where the interior rearview mirror assembly is located within the interior cabin of a vehicle;

wherein image data captured by the camera is provided from the interior rearview mirror assembly to the ECU;

wherein provided captured image data is processed at the ECU to monitor a driver of the vehicle;

wherein provided captured image data is processed at the ECU for video-calling;

a microphone disposed within the interior cabin of the vehicle, wherein the microphone is operable to capture audio speech data from within the interior cabin of the vehicle;

a speaker disposed within the interior cabin of the vehicle, wherein the speaker is operable to output audio within the interior cabin of the vehicle;

wherein the vehicle comprises a control system that is operable to at least partially control the vehicle as the vehicle travels along a road;

a video display screen disposed within the interior cabin of the vehicle, wherein the video display screen is operable to display video images for viewing by an occupant of the vehicle;

wherein, based at least in part on (i) processing at the ECU of provided captured image data and (ii) audio speech data captured by the microphone, video-calling wireless communication between the occupant of the vehicle and a party exterior of the vehicle is enabled;

wherein video-calling wireless communication between the occupant of the vehicle and the party exterior of the vehicle comprises wireless communication from the vehicle to an external receiver located remote from the vehicle that is based at least in part on (i) audio speech data captured by the microphone and (ii) processing at the ECU of provided captured image data;

wherein video-calling wireless communication between the occupant of the vehicle and the party exterior of the vehicle comprises wireless communication from the external receiver to the vehicle of data;

wherein, with the control system operating to at least partially control the vehicle as the vehicle travels along the road, video-calling wireless communication between the occupant of the vehicle and the party exterior of the vehicle comprises (i) audio speech data captured by the microphone and wirelessly communicated from the vehicle to the external receiver, (ii) audio output by the speaker that is derived from audio data that is wirelessly communicated from the external receiver to the vehicle, (iii) image data captured by the camera and wirelessly communicated from the vehicle to the external receiver and (iv) display at the video display screen of video images that are at least in part based on image data that is wirelessly communicated from the external receiver to the vehicle; and wherein, with the control system not operating to at least partially control the vehicle as the vehicle travels along the road, and with speed of the vehicle exceeding a threshold speed, (a) video-calling wireless communication between the occupant of the vehicle and the party exterior of the vehicle is provided via (i) audio speech data captured by the microphone and wirelessly communicated from the vehicle to the external receiver and (ii) audio output by the speaker that is derived from audio data that is wirelessly communicated from the external receiver to the vehicle, and (b) the video display screen does not display video images that are at least in part based on image data that is wirelessly communicated from the external receiver to the vehicle.

16. The vehicular driver monitoring system of claim 15, wherein, with the control system not operating to at least partially control the vehicle as the vehicle travels along the road, and with speed of the vehicle exceeding the threshold speed, video-calling wireless communication between the occupant of the vehicle and the party exterior of the vehicle is in part provided via image data captured by the camera and wirelessly communicated from the vehicle to the external receiver.

17. The vehicular driver monitoring system of claim 15, wherein, during a reversing maneuver of the vehicle, the video display screen is operable to simultaneously display (i) video images that are at least in part based on image data that is wirelessly communicated from the external receiver to the vehicle and (ii) video images derived from image data captured by a rear backup camera of the vehicle, and wherein the displayed video images that are at least in part based on image data that is wirelessly communicated from the external receiver to the vehicle and the displayed video images derived from image data captured by the rear backup camera of the vehicle are discrete and discernible, one from the other.

18. The vehicular driver monitoring system of claim 15, wherein a light emitter is disposed at the mirror head of the interior rearview mirror assembly and is operable to emit near infrared light to illuminate at least a portion of the driver of the vehicle that is viewed by the camera.

19. The vehicular driver monitoring system of claim 15, wherein provided captured image data is processed at the ECU to determine at least one selected from the group consisting of (i) the driver's eyes being closed, (ii) the driver's eyes being off a road ahead of the vehicle, (iii) the driver being drowsy and (iv) the driver yawning.

20. A vehicular driver monitoring system, the vehicular driver monitoring system comprising:

an interior rearview mirror assembly disposed at an interior portion of an interior cabin of a vehicle;

wherein the interior rearview mirror assembly comprises a mirror head that accommodates a mirror reflective element, and wherein the mirror reflective element of the interior rearview mirror assembly comprises a transflective mirror reflector;

a camera disposed within the mirror head of the interior rearview mirror assembly of the vehicle;

wherein the camera views through the transflective mirror reflector of the mirror reflective element toward at least a front driver seat region of the vehicle;

a light emitter disposed within the mirror head of the interior rearview mirror assembly and operable to emit near infrared light that passes through the transflective mirror reflector of the mirror reflective element to illuminate at least a portion of a driver of the vehicle that is present at the front driver seat region of the vehicle and that is viewed by the camera;

an electronic control unit (ECU) comprising electronic circuitry and associated software, wherein the electronic circuitry comprises an image processor for processing image data captured by the camera;

wherein the ECU is disposed in the vehicle at a location remote from where the interior rearview mirror assembly is located within the interior cabin of a vehicle;

wherein image data captured by the camera is provided from the interior rearview mirror assembly to the ECU;

wherein provided captured image data is processed at the ECU to at least one selected from the group consisting of (i) determine that the driver's eyes are closed, (ii) determine that the driver's eyes are off a road ahead of the vehicle, (iii) determine that the driver is drowsy, (iv) determine that the driver is yawning and (v) monitor the driver of the vehicle;

wherein provided captured image data is processed at the ECU for video-calling;

a microphone disposed within the interior cabin of the vehicle, wherein the microphone is operable to capture audio speech data from within the interior cabin of the vehicle;

a speaker disposed within the interior cabin of the vehicle, wherein the speaker is operable to output audio within the interior cabin of the vehicle;

a video display screen disposed within the interior cabin of the vehicle, wherein the video display screen is operable to display video images for viewing by an occupant of the vehicle;

wherein, based at least in part on (i) processing at the ECU of provided captured image data and (ii) audio speech data captured by the microphone, video-calling wireless communication between the occupant of the vehicle and a party exterior of the vehicle is enabled;

wherein video-calling wireless communication between the occupant of the vehicle and the party exterior of the vehicle comprises wireless communication from the vehicle to an external receiver located remote from the vehicle that is based at least in part on (i) audio speech data captured by the microphone and (ii) processing at the ECU of provided captured image data;

wherein video-calling wireless communication between the occupant of the vehicle and the party exterior of the vehicle comprises wireless communication from the external receiver to the vehicle of data;

wherein video-calling wireless communication between the occupant of the vehicle and the party exterior of the vehicle comprises (i) audio speech data captured by the microphone and wirelessly communicated from the vehicle to the external receiver, (ii) audio output by the speaker that is derived from audio data that is wirelessly communicated from the external receiver to the vehicle, (iii) image data captured by the camera and wirelessly communicated from the vehicle to the external receiver and (iv) display at the video display screen of video images that are at least in part based on image data that is wirelessly communicated from the external receiver to the vehicle; and wherein, with speed of the vehicle exceeding a threshold speed, (a) video-calling wireless communication between the occupant of the vehicle and the party exterior of the vehicle is provided via (i) audio speech data captured by the microphone and wirelessly communicated from the vehicle to the external receiver and (ii) audio output by the speaker that is derived from audio data that is wirelessly communicated from the external receiver to the vehicle, and (b) the video display screen does not display video images that are at least in part based on image data that is wirelessly communicated from the external receiver to the vehicle.

21. The vehicular driver monitoring system of claim 20, wherein, with speed of the vehicle exceeding the threshold speed, video-calling wireless communication between the occupant of the vehicle and the party exterior of the vehicle is in part provided via image data captured by the camera and wirelessly communicated from the vehicle to the external receiver.

22. The vehicular driver monitoring system of claim 20, wherein the vehicle comprises a control system that is operable to at least partially control the vehicle as the vehicle travels along a road, and wherein, with speed of the vehicle exceeding the threshold speed, and with the control system operating to at least partially control the vehicle as the vehicle travels along the road, the video display screen displays video images that are at least in part based on image data that is wirelessly communicated from the external receiver to the vehicle.

23. The vehicular driver monitoring system of claim 20, wherein, during a reversing maneuver of the vehicle, the video display screen is operable to simultaneously display (i) video images that are at least in part based on image data that is wirelessly communicated from the external receiver to the vehicle and (ii) video images derived from image data captured by a rear backup camera of the vehicle, and wherein the displayed video images that are at least in part based on image data that is wirelessly communicated from the external receiver to the vehicle and the displayed video images derived from image data captured by the rear backup camera of the vehicle are discrete and discernible, one from the other.

24. The vehicular driver monitoring system of claim 20, wherein the light emitter comprises at least one near infrared light emitting diode.

25. The vehicular driver monitoring system of claim 20, wherein the light emitter comprises at least one vertical-cavity surface-emitting laser.

26. The vehicular driver monitoring system of claim 20, wherein the light emitter is operated to emit near infrared light at least when ambient light within the interior cabin of the vehicle is less than a threshold level.

* * * * *